US007653943B2

(12) United States Patent  (10) Patent No.: US 7,653,943 B2
Evans et al.  (45) Date of Patent: *Jan. 26, 2010

(54) SECURE MEDIA PATH METHODS, SYSTEMS, AND ARCHITECTURES

(75) Inventors: Glenn F. Evans, Kirkland, WA (US); John Bradstreet, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

This patent is subject to a terminal disclaimer.

(21) Appl. No.: 11/275,991

(22) Filed: Feb. 8, 2006

(65) Prior Publication Data

US 2006/0137028 A1 Jun. 22, 2006

Related U.S. Application Data

(62) Division of application No. 10/178,256, filed on Jun. 24, 2002, now Pat. No. 7,296,154.

(51) Int. Cl.
*H04N 7/16* (2006.01)
*G06F 11/30* (2006.01)
(52) U.S. Cl. ....................... 726/26; 713/187
(58) Field of Classification Search .................. 726/26; 713/187
See application file for complete search history.

(56) References Cited

U.S. PATENT DOCUMENTS

| 5,473,692 | A  | 12/1995 | Davis |
| 5,983,350 | A  | 11/1999 | Minear et al. |
| 6,058,476 | A  | 5/2000  | Matsuzaki et al. |
| 6,157,721 | A  | 12/2000 | Shear et al. |
| 6,209,099 | B1 | 3/2001  | Saunders |
| 6,363,488 | B1 | 3/2002  | Ginter et al. |
| 6,374,355 | B1 | 4/2002  | Patel |
| 6,772,340 | B1 | 8/2004  | Peinado et al. |
| 6,799,270 | B1 | 9/2004  | Bull et al. |

(Continued)

FOREIGN PATENT DOCUMENTS

EP  1120967 A2  8/2001

(Continued)

OTHER PUBLICATIONS

Bajikar, Sundeep, "Trusted Platform Module (TPM) based Security on Notebook PCs—White Paper," Mobile Platforms Group Intel Corporation, Jun. 20, 2002, retrieved from the Internet: <URL:http://www.intel.com/design/ mobile/platform/downloads/Trusted_Platform_Module_White_Paper.pdf>retrieved on Oct. 28, 2003, pp. 1-20.

(Continued)

*Primary Examiner*—Christopher J Brown
(74) *Attorney, Agent, or Firm*—Lee & Hayes, PLLC (57) ABSTRACT

Methods, systems and architectures for processing renderable digital content are described. The various embodiments can protect against unauthorized access or duplication of unprotected content (i.e. decrypted content) once the content has reached a rendering device such as a user's computer. A flexible framework includes an architecture that allows for general media sources to provide virtually any type of multimedia content to any suitably configured rendering device. Content can be protected and rendered locally and/or across networks such as the Internet. The various embodiments can provide a standard platform that can that can be leveraged to protect content across a wide variety of rendering environments, content types, and DRM techniques.

17 Claims, 8 Drawing Sheets

U.S. PATENT DOCUMENTS

| | | | |
|---|---|---|---|
| 6,816,596 B1 | 11/2004 | Peinado et al. | |
| 6,829,708 B1 | 12/2004 | Peinado et al. | |
| 7,296,154 B2 | 11/2007 | Evans et al. | |
| 2001/0044782 A1 | 11/2001 | Hughes et al. | |
| 2002/0002674 A1 | 1/2002 | Grimes et al. | |
| 2002/0010863 A1 | 1/2002 | Mankefors | |
| 2002/0012432 A1 | 1/2002 | England et al. | |
| 2002/0049679 A1* | 4/2002 | Russell et al. | 705/52 |
| 2003/0084306 A1 | 5/2003 | Abburi et al. | |
| 2003/0097655 A1* | 5/2003 | Novak | 725/31 |
| 2003/0115147 A1 | 6/2003 | Feldman et al. | |
| 2003/0126086 A1* | 7/2003 | Safadi | 705/51 |
| 2003/0159037 A1 | 8/2003 | Taki et al. | |
| 2004/0010684 A1 | 1/2004 | Douglas | |
| 2005/0010766 A1 | 1/2005 | Holden et al. | |

FOREIGN PATENT DOCUMENTS

| | | |
|---|---|---|
| WO | WO0152020 | 7/2001 |
| WO | WO0219598(A2) | 3/2002 |

OTHER PUBLICATIONS

Choudhury, A., et al., "Copyright Protection for Electronic Publishing Over Computer Networks," IEEE Network, May/Jun. 1995, pp. 12-20.

Intel Corporation, IBM, Matsushita, Toshiba, "Content Protection System Architecture A Comprehensive Framework for Content Protection," Feb. 17, 2000, retrieved from the Internet: <URL: http://www.4centity.com/data/tech/cpsa/cpsa081.pdf>, retrieved Oct. 28, 2003, pp. 1-19.

Using Windows Media Rights Manager to Protect and Distribute Digital media, Windows Media Technologies, Online Dec. 1, 2001, retrieved from URL:http://msdn.microsoft.com/msdnmag/Issues/01/12/DRM/print.asp on Nov. 23, 2004.

N. A., "Overview of Security of Windows Media Right Manager", Microsoft, Dec. 3, 2001 <http://msdn.microsoft. com/ja-jp/library/dd148624.aspx> in Japanese, considered to extent able.

Pruneda, Andrea, "Windows Media Technologies: Using Windows Media Rights Manager to Protect and Distribute Digital Media", MSDN magazine Japanese version, Jan. 2002, ASCII Corporation, Japan, Jan. 18, 2002, No. 22, pp. 68-82 in Japanese considered to extent able.

* cited by examiner

SECURE MEDIA PATH METHODS, SYSTEMS, AND ARCHITECTURES

RELATED APPLICATIONS

This application is a divisional of and claims priority to U.S. patent application Ser. No. 10/178,256, filed on Jun. 24, 2002, the disclosure of which is incorporated by reference herein.

BACKGROUND

Protecting the ownership of digital content, such as multimedia content and The like, and the usage rights of authorized users of such content has, in recent Years, become very important. The importance of protecting such content will inevitably continue to grow as the content is more easily distributed, particularly in the environment of computing networks such as the Internet.

There are many scenarios that can benefit and thrive from content protection techniques. For example, movie content providers can more easily sell content directly to individuals when the providers are assured that their content will be protected. Additionally, users can more easily and conveniently receive content from subscription style services (such as cable providers, pay-per-view digital satellite, and the like). Further, users can store and playback content at a later date or make copies for themselves, while still ensuring that the content owner's rights are still maintained. Additionally, users can create their own content and know that they can restrict who can view it. For example, a user could post private home videos to a web site and only allow other family members to view it for a limit period of time.

When content is provided to a device and played for a user, a well defined architecture (with both software and hardware components) is typically required to coordinate playback and to ensure that digital rights are protected and maintained. Often times protected content is transferred to a user's device (e.g. a computing device, set top box and the like) from a content source such as a video web server or even from a local hard drive. The content can typically be encoded or compressed and encrypted at the content source. Subsequently, the user's device decrypts the content, decompresses it, and displays or otherwise renders the content for the user on, for example, a monitor and/or speakers.

Content is typically protected using digital rights management (DRM) techniques that continue to develop and evolve. DRM techniques typically utilize software that enables secure distribution and, perhaps more importantly, disables illegal distribution of paid content over a network such as the Web. Current DRM efforts have focused primarily on securing audio content. However, as the bandwidth of networks increases, distributing video directly to end users will become technically efficient and feasible. Valuable digital content is also now becoming increasingly available through other sources such as digital TV, digital cable or via digital media.

In the future, architectures for enabling a user to experience digital content will have to exist that resist circumvention and unauthorized access by both users and by adversarial entities. At the same time, the architectures should be flexible enough to grant legitimate access to any trusted component, should allow new applications, software components and hardware devices to be used with protected content, work with a variety of different types of media, and provide some mechanism to authenticate and play content on remote hardware devices such as hand held PDAs, play to remote digital speakers, and the like.

Architectures also need to be flexible and abstracted enough so that only the lower infrastructure layers are required to be trusted, thereby allowing untrusted applications to play protected content without knowledge of it being protected.

Accordingly, this invention arose out of concerns associated with providing improved methods and systems for processing renderable digital data in a manner that provides a desirable degree of flexible security.

SUMMARY

Methods, systems and architectures for processing renderable digital content are described. The various embodiments can protect against unauthorized access or duplication of unprotected content (i.e. decrypted content) once the content has reached a rendering device such as a user's computer. A flexible framework includes an architecture that allows for general media sources to provide virtually any type of multimedia content to any suitably configured rendering device. Content can be protected and rendered locally and/or across networks such as the Internet.

The inventive architecture can allow third parties to write components and for the components to be securely and flexibly incorporated into a processing chain. The components can be verified by one or more authenticators that are created and then used to walk the chain of components to verify that the components are trusted. The various embodiments can thus provide a standard platform that can be leveraged to protect content across a wide variety of rendering environments, content types, and DRM techniques.

DETAILED DESCRIPTION

Overview

The methods, systems and architectures described below are directed to providing a protected media path from some source of protected content (e.g. a DRM server, DVD server (usually a DVD disc drive), HDTV server (usually a TV station broadcasting to a tuner card a on a PC) or any particular type of content server) to and through a device (including the device's software and hardware) that can render or otherwise play the protected content for a user.

Figure 1:
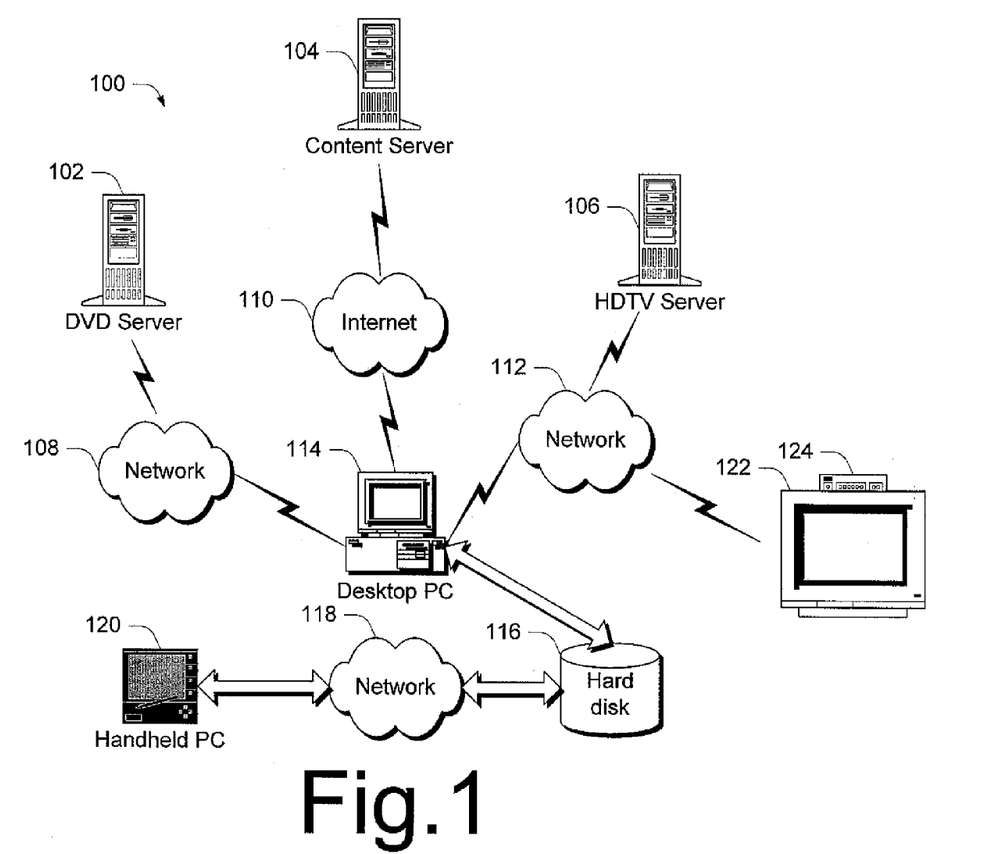
FIG. 1 is a high level block diagram of a system within which various inventive principles can be employed.

As an example, consider FIG. 1. There, a system 100 includes a number of different types of protected content sources or providers such as a DVD server 102, a content server 104 (such as one that can provide audio content, audio/video content, and the like), HDTV server 106, and a local hard disk 116, to name just a few. The content providers are configured to provide their content over various mediums that can include networks such as networks 108, 110, 112, 118, busses (such as PCI and AGP busses) and the like. The content is typically provided to some type of device that can present the content to a user. Exemplary devices include, without limitation, a personal computer 114, handheld PC 120, television 122 with, for example, a set top box 124, and the like.

In the discussion that appears below, the target hardware for such content is, in one embodiment, a local PC with a protected video card on it, and in other embodiments, a remote handheld device such as a handheld computer. It is to be appreciated and understood that such examples are intended to illustrate but a few exemplary environments in which the inventive principles described herein can be employed. Accordingly, other types of devices can be employed without departing from the spirit and scope of the claimed subject matter.

The methods, systems and architectures described below can be directed to handling different types of content formats, many of which can have specific DRM (digital rights management) characteristics which can include, in many instances, their own rights management and encryption. This can greatly increase the flexibility and robustness with which content can be protected. Accordingly, having a flexible architecture can avoid a situation where all content must necessarily be tied to one particular type of DRM format. Hence, in one or more of the embodiments described below, one advantageous feature of the architecture is that third parties can write and provide translator modules that can be imported into the architecture, and then used to map into a common rights management and encryption system that can ensure that architectural components are trusted and verified.

In addition, the embodiments described below can embody one or more of the following features and/or advantages. An authenticator mechanism is provided and can be generalized into a recursive algorithm that follows the flow of data. In some embodiments, an initial authenticator is provided and begins authenticating the chain of components that will handle protected data. Additional authenticators can be created along the chain and can establish a secure channel through which they can communicate. The authenticators need not initially have knowledge of the structure of the data graph in order to perform their authentication duties. Various embodiments can make use of revocation lists that can prevent the use of known components that have been compromised. Further, in some embodiments, direct authentication of hardware and encryption to hardware devices is possible. Various embodiments can be configured to work with untrusted applications. In this case, data can be protected from the untrusted application, yet can still be processed by the component chain by trusted and verified components. Authorized applications, such as those that are trusted, can be granted access to the data. This is useful for enabling applications to manipulate data as by performing visualizations or modifications to the data.

Various embodiments can be implemented in connection with remote devices that can render data over various buses, networks and the like, with full authentication and encryption support. This can allow a host to perform most of the preprocessing and interface control so that the remote device (e.g. a PDA) can simply display the data. Additionally, various embodiments can process protected content from a variety of sources. That is, protected content can be produced by both local devices (e.g. DVD drive, video cameras, TV tuners, digital cable) and remote sources (such as a web or video server). Further, data processing chains can be re-used within other data processing chains. For example, almost all of the components used to playback secure audio can be reused to protect the audio track from a video clip.

These and other advantages will become apparent in light of the discussion that follows.

The embodiments can process any stream of data and are not specifically is bound to only video or audio data. Thus, the embodiments can be used to protect other data formats.

Exemplary Computing System

Figure 2:
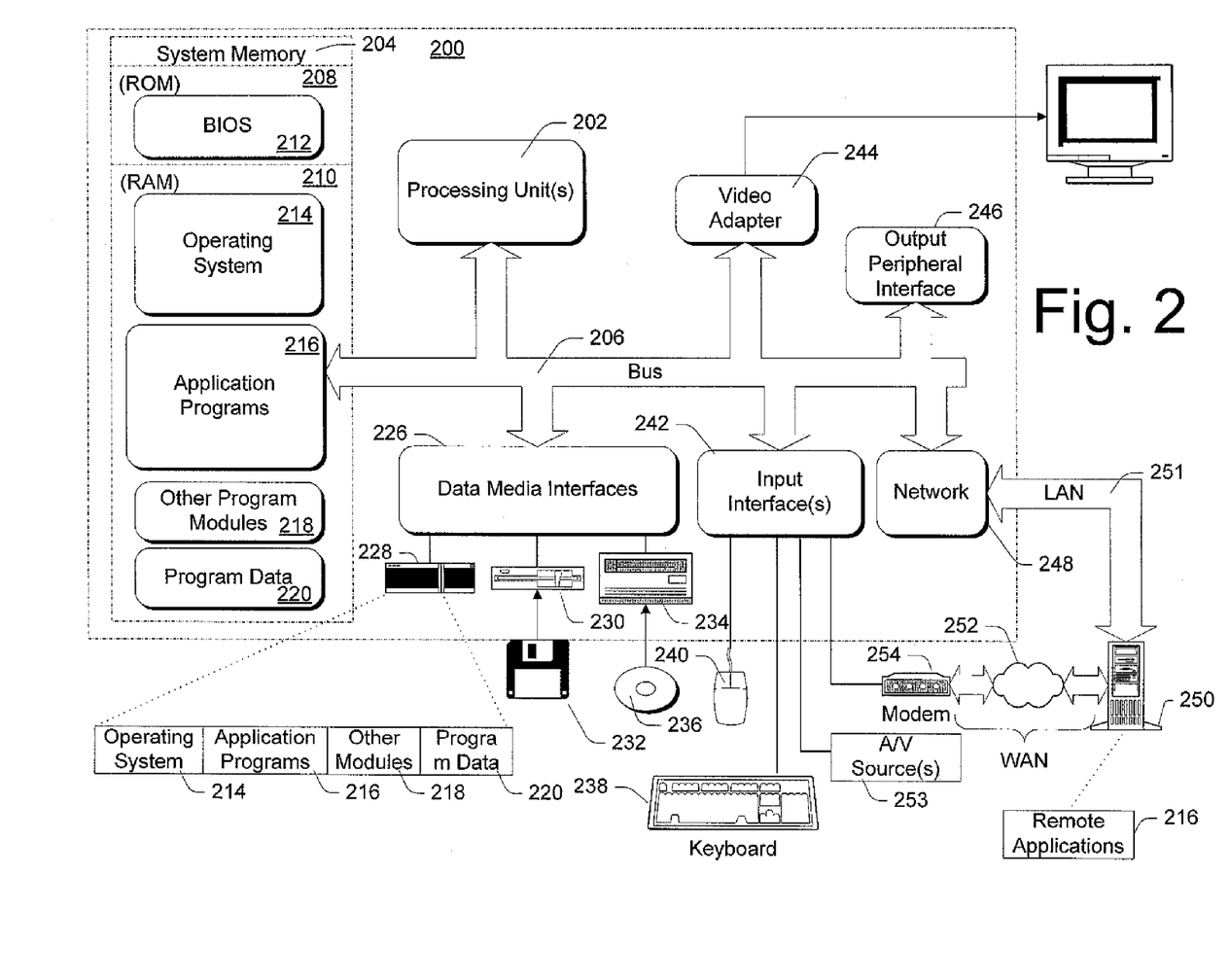
FIG. 2 is a block diagram of an exemplary computing environment within which principles of the described embodiment can be implemented.

FIG. 2 illustrates an example of a suitable computing environment 200 on which the system and related methods described below can be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Exemplary Embodiments

Figure 3:
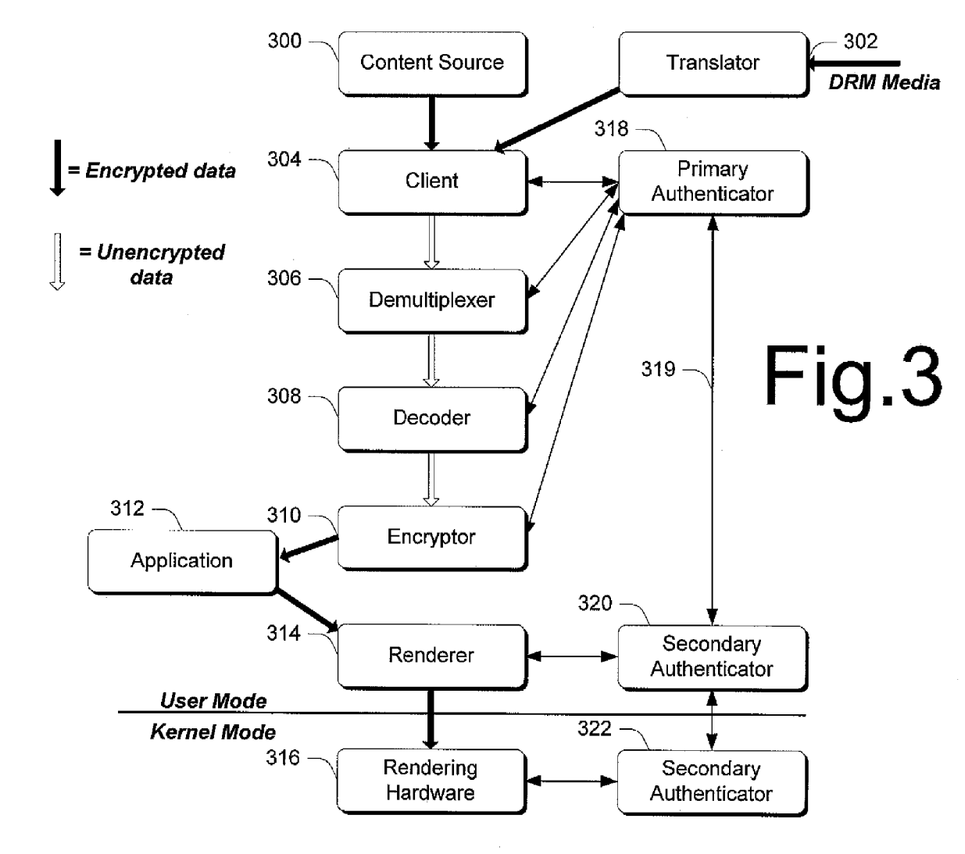
FIG. 3 is a block diagram that illustrates an exemplary system that can be utilized to implement one or more of the embodiments.

FIG. 3 illustrates an exemplary chain of components that is useful in understanding various inventive principles described herein. One overall goal of the FIG. 3 system is to be able to receive encrypted data or content, and DRM data from some source or sources, map the data into a common system, and then be able to have a license specify that the data or content requires a protected media path. Subsequently, the system should be able to verify that the system's components that make up the media path are trusted. One aspect of the described embodiments is that the architecture can facilitate handling many different types of data formats and can be employed in the context of many different types of components. That is, the architecture does not need to be inextricably tied to any specific components for effectively being able to process and render protected content.

The discussion that follows provides somewhat of a high level, functional overview of a system that embodies various inventive principles in accordance with one embodiment. More detailed aspects of an exemplary system are described in the section entitled "Implementation Example—Local Device Embodiment" below.

The illustrated system can effectively be broken down into six stages for purposes of understanding various inventive principles, each of which is discussed in more detail below:

A content source component and its connection to a license server (e.g. content source 300);

A client component and associated components to decrypt the data and process content manifests that contain DRM content (e.g. client 304);

A demultiplexer, decoders and data re-encryptors (e.g. demultiplexer 306, decoder 308, and encryptor 310);

An application for processing and mixing data streams (e.g. application 312);

One or more renderers that set up hardware decryption and schedule the display of the data (e.g. renderer 314); and Hardware for decrypting and rendering the data (e.g. rendering hardware 316).

In addition to the above-listed stages, the illustrated system also makes use of multiple different authenticators that are created during a verification process to effectively confirm that components that make up the system are trusted. This can be done by verifying digital signatures that are embodied on the components. In this example, there are three authenticators-a primary authenticator 318, and two secondary authenticators 320, 322. Notice that authenticators 318 and 320 are user mode authenticators and accordingly, are used to verify user mode components. Authenticator 322, on the other hand, is a kernel mode authenticator and is used to verify kernel mode components.

Further, the system can employ a translator such as translator 302. Translator 302 can be used to translate content and license data from one DRM format into one that is understood by the system. That is, one of the advantages of the system about to be described is that the system can be configured to work in connection with different, so-called "foreign" DRM formats that the system does not natively understand. Specifically, translator components can be written by, for example, third parties, that enable different diverse DRM formats to be employed with a common architecture. That way, the system can be imparted with a degree of flexibility that stretches across a wide variety of known or subsequently developed DRM formats.

Content Source

In this particular example, content source components, such as content source 300, are responsible for reading any native DRM sources (i.e. sources that it understands) or translating foreign DRM formats into a DRM format that it understands. The latter task can be accomplished with the help of translator 302 which may or may not comprise part of the content source. The translator 302 can be used to transcrypt the content and license into an understandable DRM format.

Local devices that provide DRM content (such as a DTV receiver) can translate the encryption system and license restrictions into an understandable DRM format. A driver associated with such devices can be issued a signature to be able to create the DRM content. Its license can then specify a dependency on a remote licensing server so that revocation lists can be updated. Revocation lists can typically be provided to enable the system to ascertain which components have been compromised. For example, a license may require a weekly revocation list which could be locally cached.

Client and Authenticators

Client 304 typically receives encrypted content and a license that can be included as part of a manifest that the client receives. The manifest can typically describe the components of a rendering pipeline that are necessary for rendering the content. The license can also include additional information such as the level of security that the content requires. This is discussed in additional detail below.

The manifest can also indicate the type of authenticators that are required to be used for verifying components in the rendering pipeline. Alternatively, the manifest can require certain types of authenticators, and can then rely on the other pipeline components, such as the renderers, to create corresponding authenticators, such as an audio and video kernel authenticator.

After setting up a network connection or capture source, the content source can instruct client 304 to bind according to the license. The content source can also set up any source related information for use by the client or other components to assist in the binding process. When the license is bound, the client can create one or more authenticators (e.g. video and audio authenticator) such as authenticator 318. The client can pass license requirements to the authenticator when it is instantiated.

The authenticator(s) can then "walk" through the components in the pipeline to verify signatures of components that handle unencrypted data. For example, in the illustrated system, client 304 can be authenticated by a secure server after which the client can create authenticator 318. Once created, authenticator 318 can verify that demultiplexer 306, decoder 308 and encryptor are all trusted.

Additionally, in this example, whenever data is passed over a bus, or between unauthenticated components (using, for example, encrypted links), or to the kernel space, a secondary authenticator can be created to verify the remainder of the data flow pipeline. Hence, in this example, renderer 314 can create a secondary authenticator 320 that then verifies that the renderer is trusted. Authenticators 318, 320 can then set up an authenticated, encrypted channel 319 between them.

The authenticated encrypted channel 319 can be used for a number of different purposes. For example, the channel can allow communication between adjacent authenticators. This can, for example, allow the secondary authenticators to report back verification information and validation or other requests to the original authenticator. Additionally, the authenticators should be able to check revocation lists that describe components that have been compromised and can thus no longer be trusted. Further, the authenticated, encrypted channel can be used to set up encryption sessions for encrypting video and audio data between the trusted components.

On a remote rendering device with hardware decryption support (such as that which is described below in more detail), a secondary authenticator can be created to proxy encryption and authentication to the remote device. Only a small, possibly untrusted, proxy component need be provided on the remote device. The remote hardware should, then, still identify itself so that it can be revoked by the primary authenticator.

For video content, a generic audio-video (AV) authenticator can verify the user mode components and the renderer can create media specific authenticators.

Demultiplexer, Decoders, and Re-Encryptors

Demultiplexer 306 typically receives unencrypted data from client 304 and splits the data into different streams, such as an audio and video stream. The demultiplexer 306 then typically passes the streams to one or more decoders, such as decoder 308, for further processing. An audio decoder (along with an encryptor such as encryptor 310) can re-encrypt the data and provide it to an application 312 for processing. A video decoder can re-encrypt the data so that it can be securely transferred over a PCI/AGP bus into a video card's random access memory (VRAM). The video decoder can typically pass partially compressed (and encrypted) data to the video card and can perform timestamp modifications, data re-arrangement and header parsing. For example, for DVD playback, the decoder can extract the vector level data and residuals and pass them to the video hardware for processing. The decoder can also perform any modifications to simulate reverse playback or variable speed effects.

Application and Mixing

Application 312 can mix the video and audio streams into mixing buffers supplied by the renderer(s). The hardware, then, is effectively passed encrypted buffers from the decoder along with lists of mixing instructions. A large number of image processing operations and non-linear video effects are possible, as by using pixel shaders and arbitrary polygon mappings. If the application requires access to unencrypted data, it can create a separated trusted worker process. The application then effectively becomes another authenticated decoder and will have to decrypt the data, process it and re-encrypt it for output to the video hardware or the next processing unit.

Renderers and Compositors

In this example, the renderers, such as renderer 314, can proxy the encryption sessions from the decoder 308 to the display and audio driver (i.e. the rendering hardware 316). The renderers are responsible for synchronization and hardware setup. The renderer can comprise various user mode APIs and code, as well as the associated operating system and driver APIs.

Once the data has been transferred to the video card's VRAM, it can possibly be decrypted and blended with other video sources then copied to a portion of memory (referred to as the "desktop" or "primary surface") that is mapped directly to a display for the user. The protected media path system described above and below should ensure that both temporary mixing buffers and the desktop are protected from unauthorized access.

One way of maintaining the integrity of data once it is on the desktop is to use trusted graphics hardware. An exemplary system is described in the following patent applications, the disclosures of which are incorporated by reference: "Systems and Methods For Securing Video Card Output", naming as inventors, Glenn Evans and Paul England, bearing Attorney Docket Number ms1-1115us, filed on Jun. 24, 2002; "Methods and Systems Providing Per Pixel Functionality", naming as inventors, Glenn Evans and Paul England, bearing Attorney Docket Number ms1-1025us, filed on Jun. 24, 2002.

Essentially, in the systems described in the referenced patent applications, output data is encrypted relative to a window's origin on the display. When a window is physically moved, either the origin is moved, or the data is encrypted relative to the new origin. Only the display hardware's DAC is capable of decrypting and displaying the data.

The content can be directly encrypted to the desktop by the decoder, or transcrypted using trusted hardware by the renderer once the final image has been assembled.

In embodiments where renderers run over a network to a "light" client, the renderers can be broken into an authenticated local component and a remote component. Compressed encrypted data and manipulation instructions can be sent over the network to the remote renderer. Blending data can be performed on the host should there be no remote hardware support.

Hardware for Rendering

The graphics card is responsible for decrypting the content stream, manipulating the data using a graphics processor unit (GPU) and displaying the output data. The patent applications incorporated by reference above describe one trusted hardware configuration that can be utilized to process protected content.

In summary, those applications describe cryptographic support that can be broken into a decryption/encryption engine in the GPU and a component that manages the keys (referred to as the "crypto-processor"). The graphics hardware can have per-pixel encryption support so that the VRAM can be maintained in an encrypted form. Each graphics operation by the GPU can then decrypt the pixel of interest, process it in some manner, and re-encrypt the output. The images can be tiled with encryption keys so that each key region will efficiently match the caches within the GPU. The output of the video DAC can provide either digital protection or analog protection. For remote displays, the display hardware can be imparted with some form of decryption support to decrypt the data sent over the network.

Figure 3A:
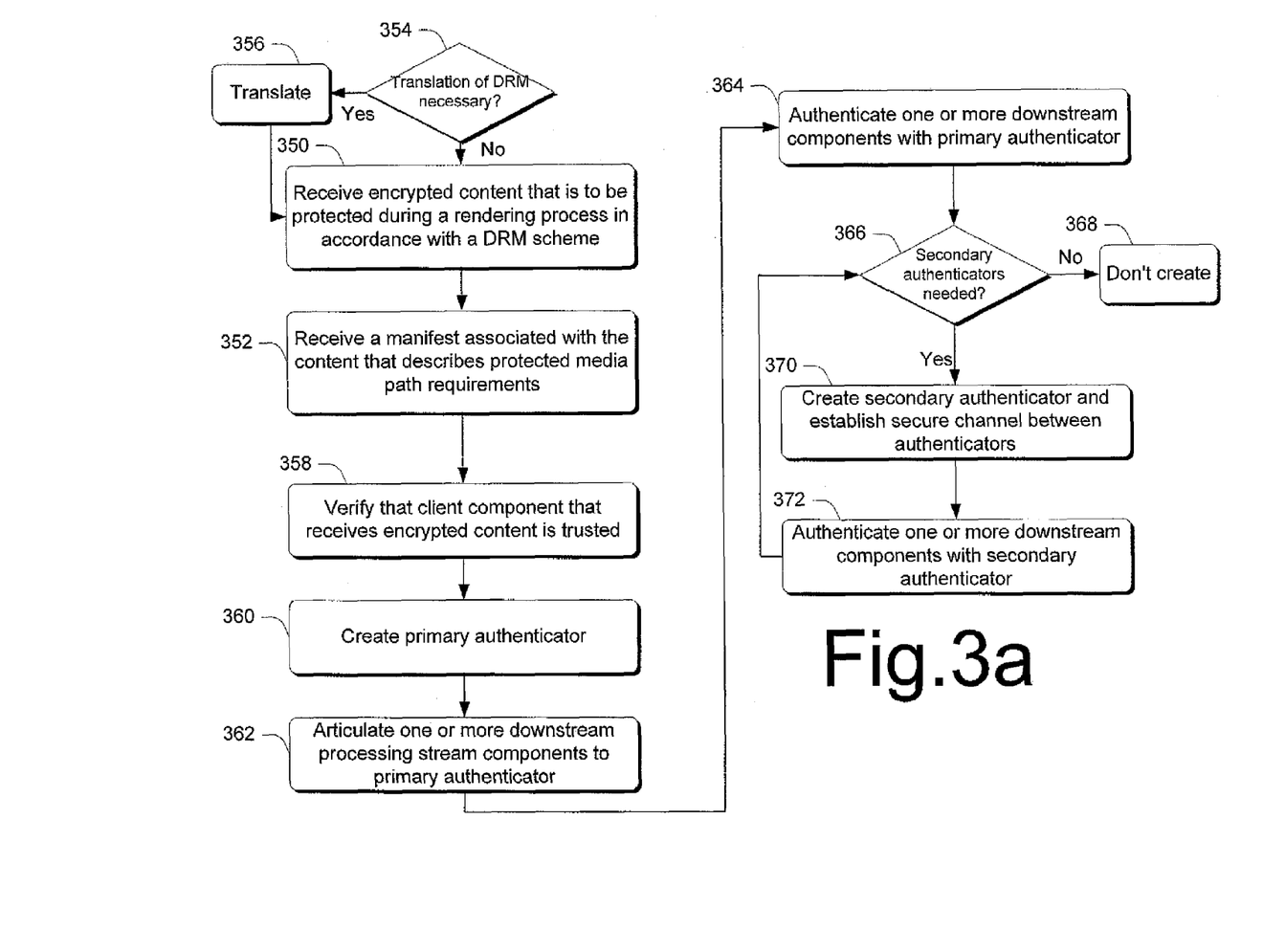
FIG. 3a is a flow diagram that illustrates steps in a method in accordance with one embodiment.

FIG. 3a is a flow diagram that describes steps in a method in accordance with one embodiment. The steps can be implemented in any suitable hardware, software, firmware, or combination thereof. In the illustrated example, the steps can be implemented in connection with a software architecture such as that which is described above and below.

Step 354 determines whether translation of the DRM is necessary. If so, step 356 can translate the DRM into a form that is understood by the processing system that is to render the content. This step can be accomplished with a separate translator module that can, in some instances, be supplied by third party software vendors. Step 350 receives encrypted content that is to be protected during a rendering process. The content is to be protected in accordance with a DRM scheme. The content can be received from any suitable source, examples of which are given above. Step 352 receives a manifest associated with the content. Steps 350 and 352 can be performed by a suitably configured client, such as client 304 (FIG. 3). The manifest describes protected media path requirements that circumscribe the process by which the content is to be rendered. Such requirements can and typically do come in the form of a license. The manifest 7 may or may not be received contemporaneously with the encrypted content.

Continuing, step 358 verifies that the client component that receives the encrypted content is trusted. This step can be implemented by a secure server that can, for example, verify a digital signature that is associated with the client. Step 360 creates a primary authenticator. This step can be implemented by the client. Step 362 articulates one or more downstream processing stream components to the primary authenticator. This step can be implemented by the client and/or any of the downstream components. In one embodiment, the primary authenticator queries the client as to the components that it passes data to, and then queries those components and so on. Step 364 authenticates one or more downstream components with the primary authenticator. This step can be implemented by verifying digital signatures associated with the various components by, for example, using a secure server.

Step 366 determines whether any secondary authenticators are needed. A secondary authenticator can be needed for any suitable reason, examples of which are given below. If secondary authenticators are not needed, step 368 does not create one. If, on the other hand, a secondary authenticator is needed, step 370 creates a secondary authenticator and establishes a secure channel between the authenticators. Step 372 then uses the secondary authenticator to authenticate one or more downstream components. The method can then branch back to step 366 to determine whether any additional secondary authenticators are needed.

Implementation Example—(Local Device Embodiment)

Figure 4:
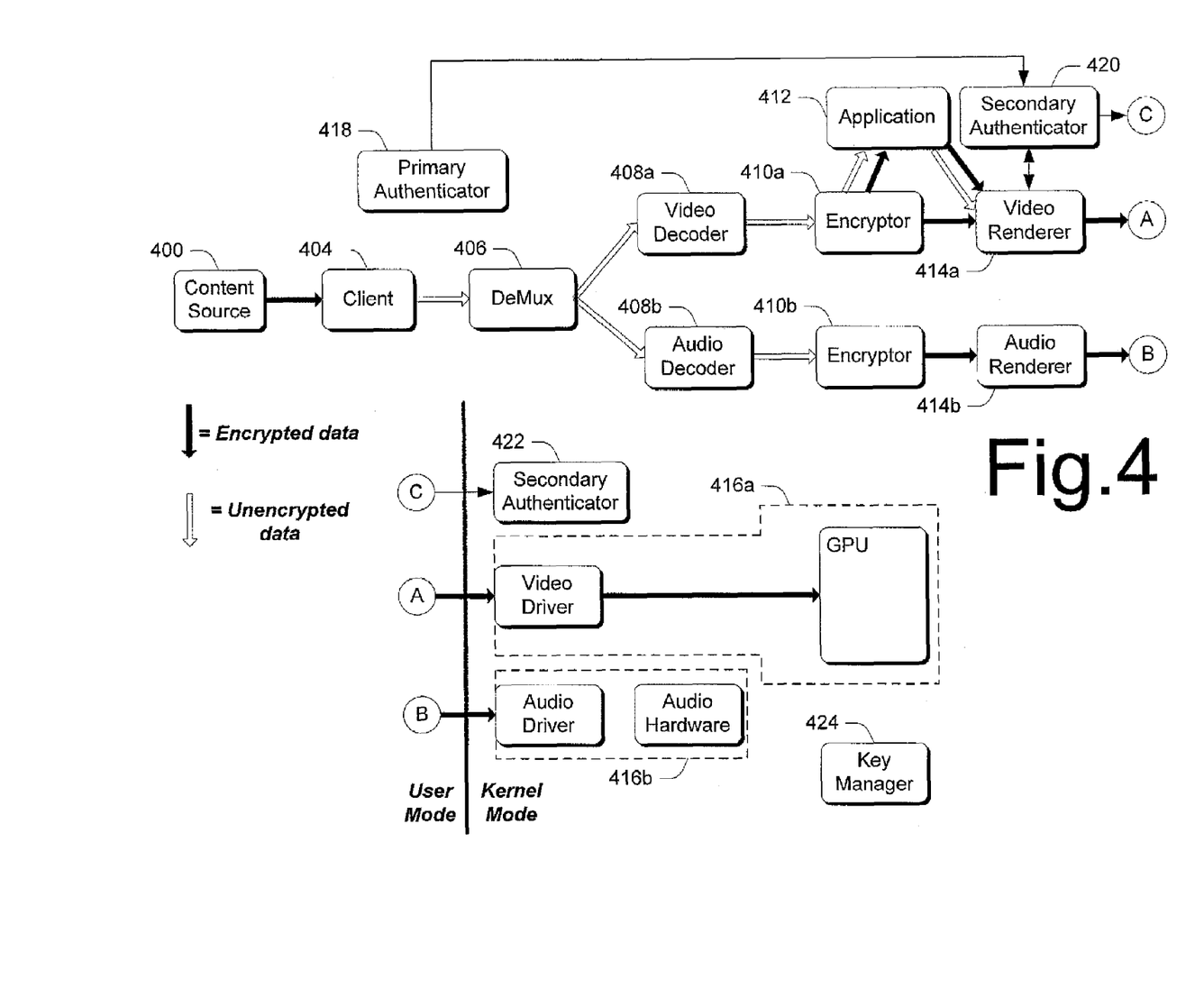
FIG. 4 is a block diagram that illustrates an exemplary system that can be utilized to implement one or more of the embodiments.

FIG. 4 shows an exemplary system that is configured to process protected media in accordance with one embodiment. The system is similar, in some respects, to the system shown and described in FIG. 3. In this particular example, the system is configured to process audio/video data on a local device. Suitable local devices can include a local PC, set top box, or any device that typically processes audio/video data.

The FIG. 4 system includes a video path and an audio path. The video path is comprised of a chain of components (e.g. parsing and transform components), both user mode and kernel mode, that produce video that is placed into a video card's VRAM. The frame buffer is displayed onto the desktop and sent to an output device through the DAC. An audio path is also provided for processing the audio stream.

The FIG. 4 system includes a content source 400 that provides protected content. Such content, as noted above, can typically be accompanied by or associated with a license, often included within a manifest. The license typically circumscribes the content's use by describing such things as who can use the content and how it is to be used. The license can also specify such things as revocation lists that are to be used in conjunction with the content, the frequency of use of such revocation lists, and the source of the revocation list such as a secure server. The manifest can also typically describe the level of security that is to be used with the protected content such as the nature of the protected media path that is to be set up, the identification of components along that media path, and any encryption/decryption requirements. Note also that a translator can typically be employed to translate foreign Do content into DRM content that is understood by the system.

The content is provided by the content source to a client 404. As noted above, the license that the client gets indicates that the data requires a protected media path authenticator such as authenticator 418. In this example, a single client 404 decrypts the data that is received from the content source. Authenticators, such as authenticators 418, 420, and 422 are used to verify the chain of components that receive unencrypted data. This can be done a number of different ways such as verifying digital signatures associated with the components and/or though lists of DLL addresses. After a processing chain of components has been set up, a server, such as a DRM server, authenticates client 404. Client 404 then creates primary authenticator 418 which then locates components that process data including decrypted data. The components can be located by authenticator 418 by querying individual components as to which other components they pass data to. For example, authenticator 418 can query client 404 for which components the client provides data to. The client can respond to the authenticator by indicating that it passes data to demux 406. This can be done by passing a pointer to the authenticator that points to the demux 406. Since the demux 406 processes unencrypted data, it will need to be trusted. The demux 406 takes data that is unencrypted by the client and demultiplexes the data into a video stream and an audio stream. The video stream is processed by the video decoder 408a and its associated downstream components (i.e. encryptor 410a, video renderer 414a, video driver and GPU (collectively designated at 416a )), while the audio stream is processed by the audio decoder 408b and its downstream components (i.e. encryptor 410b, audio renderer 414b, audio driver and audio hardware (collectively designated at 416b)).

Individual components in the processing chain provide addresses, to the authenticators, of other components that they pass unencrypted data to. The authenticator then walks along the list of components and verifies the signatures of components as by, for example, verifying the signatures of the components' corresponding DLLs. This can be done using a secure server. So, for example, authenticator 418 will authenticate demux 406. The authenticator 418 will then verify both decoders 408a, 408b. After learning the components to which the decoders pass data, (i.e. encryptors 410a, 410b), the authenticator 418 will authenticate the encryptors. Application 412 may or may not be a trusted application. If the application is to handle unencrypted data, then authenticator 418 can verify that the application is trusted. If the application is not trusted, then it will simply handle encrypted data.

Eventually, the data will be passed to renderers 414a, 414b. The renderers can create their own authenticator 420 which is then verified by authenticator 418. An authenticated, encrypted channel can be established between authenticators 418, 420. Once verified, authenticator 420 can authenticate the renderers.

In this example, a kernel mode authenticator 422 is created by the renderer(s) and is authenticated by one or more of the other authenticators. Authenticator 422 can be securely linked to the user mode authenticators to verify kernel components, such as components 416a, 416b.

A key manager 424 is also provided and can be authenticated by authenticator 422. The key manager 424 can be responsible for managing encryption/decryption keys that are used by the various components in the processing chain to pass encrypted data. The key manager can also manage session keys that are used in the encryption process. Custom encryption methods can also be used and implemented, in part, by the key manager. A replaceable encryption library can, for example, be provided to intermediate components. All keys should be session-based keys to avoid having keys embedded in the various components. A public key encryption algorithm can be used for authentication and to setup the session keys between the decoder and a crypto processor on the video hardware. The encrypted channel used for the authentication can be reused by the authenticated components to setup the session keys. This ensures that the decryption key is only passed to the entity verified by the next authenticator. If a component does not route the encrypted data and the authenticator's data channel to the same destination, then the data stream cannot be decrypted by the downstream entity. The algorithm used to setup the session keys can be specific to the decoder and the rendering components. The authentication channel can be personalized to the session key generation thread to avoid spoofing the session key setup.

Each component can be, and should periodically be re-authenticated and keys should be renegotiated to help to minimize insertion attacks by foreign components. An array of session keys can allow the source to efficiently change keys at given intervals. Since setting up keys can be a relatively slow and costly process, it can be performed asynchronously to the data stream. Cycling through banks of keys can help to avoid data-key synchronization issues. For example, four keys can provide a four frame delay before a new key negotiation would have to be completed. This is discussed in more detail below in the section entitled "Key Negotiation and Synchronization".

Key Negotiation and Synchronization

Key banks typically contain multiple keys. In the video context, as the video renderer processes data, it typically queues up a number of frames for display. For efficiency reasons, using a key bank with multiple keys and synchronizing, for example, one key per frame, can alleviate problems associated with having to negotiate a new key for each frame. That is, having a key bank can reduce the key negotiation time by virtue of the fact that negotiation does not have to take place on a key-for-key basis. Thus, by using a bank of multiple keys, one key can be used per frame, and the keys can be cycled through in order. For example, keys 1 to 4 might be negotiated, where key 1 is used for frame 1, key 2 is used for frame 2, and so on. Thus, instead of having to negotiate for individual keys, negotiation take place for multiple keys at a time which are then cycled through.

As an example, in a protected video path, an array of session keys can be established between the decoder and video hardware using an authenticated PKI encryption system. Keys can then be maintained in inaccessible memory on the video card and in protected memory by the decoder. Each key can be referenced by session index. In the video hardware, data can be associated with a session index or ID that indicates which session was used to encrypt the data. The session index can be used by the GPU to set up the cryptographic engine in the GPU that can then process (i.e. decrypt) the encrypted data. The authenticator chain can be periodically renegotiated and authenticated to help reduce dictionary attacks and to attempt to detect inserted foreign components.

Authenticators

As noted above, after the playback mechanism (i.e. processing chain) has been set up, the client component decrypts the data and passes the data to the video and audio demultiplexer. As part of the authentication process, the client creates an authenticator which is then applied to the demultiplexers. The authenticator is then directed to the next video and audio processing components for authentication. The renderers can then create corresponding video/audio specific kernel authenticators. The authenticators can authenticate the digital signatures associated with the DLL at which each address is located.

The authenticators can not only verify the components' signatures, but they can also verify that the processing chain has sufficient security to satisfy the requirements in the content's license. For example, the license may specify a level of security is required of the processing chain. The security level can be passed to the authenticator which can then ensure compliance with the security level. Alternatively, the security level can be implicitly encoded by requiring a particular level of authenticator, e.g. level 1 authenticator or level 2 authenticator, both of which can invoke the primary authenticator with their level.

Exemplary security levels can include:
Bit 0—software obfuscation of compressed data (and signed video driver);
Bit 1—trusted software protection of compressed data;
Bit 2—hardware protection of compressed data over buses;
Bit 3—hardware protection of compressed data in the video/audio device;
Bit 4—analog protection of data leaving the output device; and
Bit 5—digital protection of data leaving the output device Each component can also have the ability to add restrictions to the license as a first pass in the authentication. This can allow components (e.g. decoders) to require other components to be interrogated for compatibility. For example, an audio decoder may only be licensed to be played with applications that meet certain criteria.

An additional system version requirement can also be useful for specifying a required level of driver support. For example, the license can contain a data pair (minimum protected path/driver level, minimum hardware requirements) that is passed to the authenticator to ensure compliance.

Components

Various arrangements of authenticators can be used to implement the above-described embodiments. For example, in the system shown and described in FIG. 4, there can be two separate primary authenticators—one for the video chain and one for the audio chain, or, as shown in FIG. 4, a single primary authenticator that communicates with both the audio and video chain. In addition, there can be two separate kernel mode authenticators—one for the video chain and one for the audio chain. If this is the case, then two separate authenticated, encrypted channels can be provided—one each between the authenticators of the audio chain and video chain.

In the discussion below, one specific authentication design is described. It is to be appreciated that the described design is illustrative of but one authentication design. Accordingly, other authentication designs can be provided without departing from the spirit and scope of the claimed subject matter.

Figure 5:
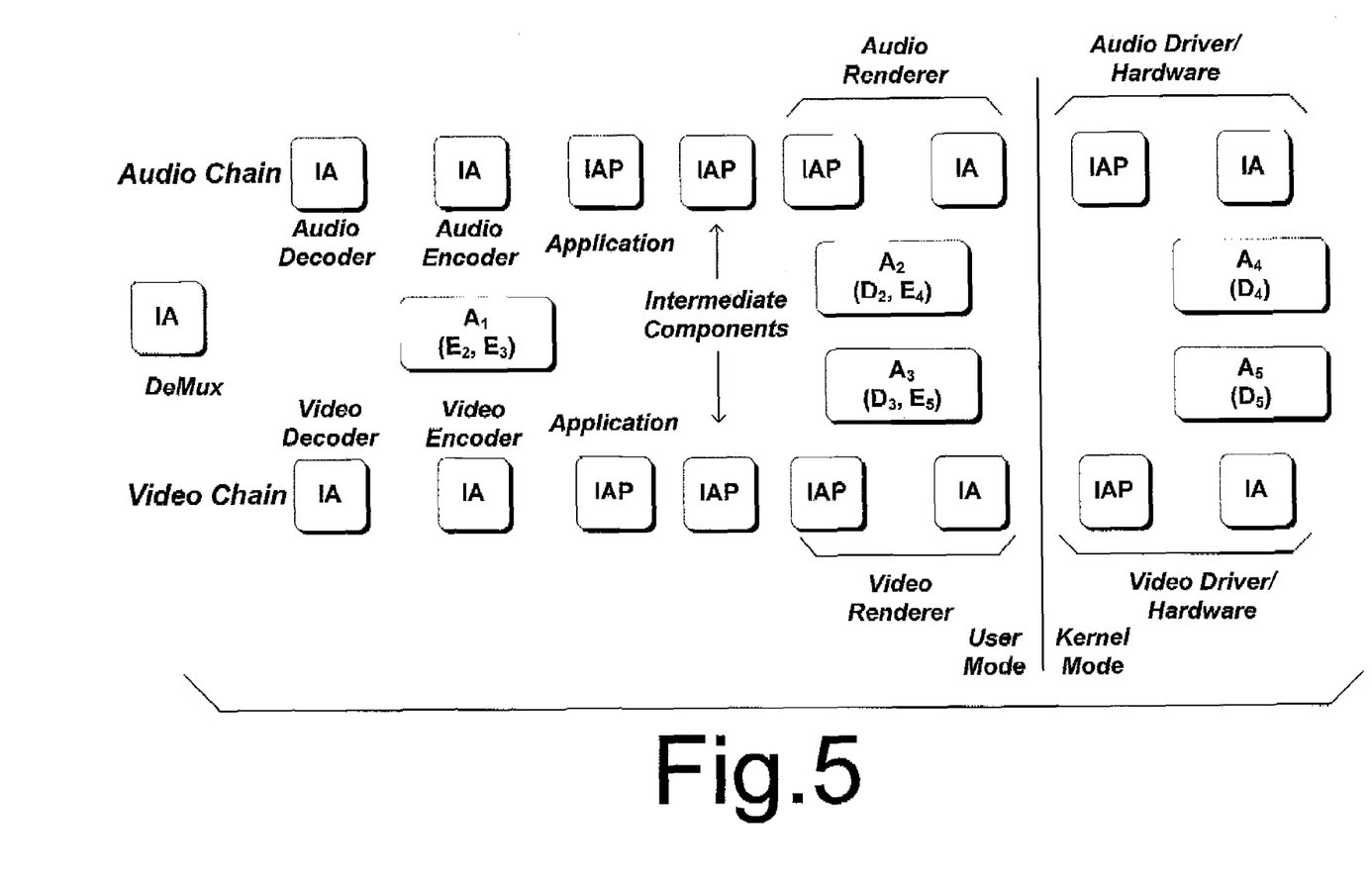
FIG. 5 is a block diagram that illustrates aspects of an authentication design in accordance with one embodiment.

FIG. 5 illustrates an exemplary authentication design where authenticators are designated as "$A_n$", and interfaces supported by various components in the processing chain are illustrated as either "IA" for an authenticable interface and/or "IAP" for an authentication proxy interface. A proxy interface acts as an interface to a forwarding service to another authenticable interface. The names of the various components are provided adjacent the corresponding component. For example, in the audio chain, the audio decoder, audio encoder, application, audio renderer and audio driver/hardware are indicated. Similarly, in the video chain, the video decoder, video encoder, application, video renderer and video driver/hardware are indicated. Notice that some components support both a proxy interface and an authenticable interface, e.g. each of the renderers.

An interface is simply a logical portion of the component and comprises a collection of callable methods that can be called by other components. Whenever an authenticator wants to communicate with a particular component, the authenticator looks for the pertinent interface on that component and communicates to it by calling the interface's methods.

An authenticator verifies components and establishes encrypted channels to other authenticators. It also provides an encrypted channel service between components that process unencrypted data. The channel can be used to negotiate arrays of session keys between components to encrypt the main data. The IA interface provides the authenticator with a list of components to verify, and a list of downstream components to continue the verification. The IAP proxy interface is a pass through interface for forwarding authentication information between authenticators linked together by unauthenticated components.

Within each authenticator, $E_n$ represents an encryption/decryption key pair of the connection initiator and $D_n$ represents an encryption/decryption key pair of the connection receiver.

The first authenticator $A_1$ can support multiple secondary authenticators (e.g. $A_{2-5}$) since it is used to verify two separate output chains (e.g. video and audio).

The client creates the initial authenticator $A_1$, and the IA interface of the first component (i.e. the DeMux) is specified to the authenticator. In this example, the IA interface returns the following information to the authenticator:

A list of IA interfaces of downstream components;
A list of IAProxy interfaces of downstream components (which only see encrypted data);
A list of dependent components on which to verify signatures;
Storage for the next authenticator link index (same authenticator can be reused for multiple streams); and
Key session number for the authentication chain.

The authenticator ($A_1$) uses the client to verify the IA interface's address, then its dependent components, and recurses on each of its downstream IA interfaces. Next the authenticator sets up an encrypted authenticated channel to the next authenticator through each of the listed IAP interfaces.

The IAP interface provides two methods to communicate to the next authenticator:
ReadData (buffer, length)
WriteData (buffer, length)

Typically, the renderer will support the TAP and IA interfaces. When the renderer's IAP interface is referenced, it will create the next authenticator and proxy the IAP calls to it. The authenticators will then establish an authenticated encrypted communication channel. The authenticator is passed the IA interface of the renderer so that it can begin a new authentication chain starting at the renderer.

The authenticators can also provide methods to allow the components with. IA interfaces to pass information across the authenticator channel. On the authenticator, this can include:
EncryptAndSend(link ID, [in] data)—send data to the next component.
On the IA's interface that was passed to the authenticator, there can exist the following callbacks:
DecryptAndReceive([out] data)—used to signal and pass data to the receiving component;

LinkIdentifier([out] link ID)—passed to the IA interface to send.

The send and receive methods can be used by the components to set up session keys for encrypting the main data.

To simplify the client, the authenticator can also provide the following simple encryption support:
CreateSession(HANDLE [out], CLSID drmEncryptorID—creates an encryptor and establish a session key;
EncryptData(HANDLE [in], BYTE* pIn, BYTE* pOut);
DecryptData(HANDLE [in], BYTE* pIn, BYTE* pOut).

The authenticator would then persist the encryption object for the component.

Network Embodiment—Case I

Figure 6:
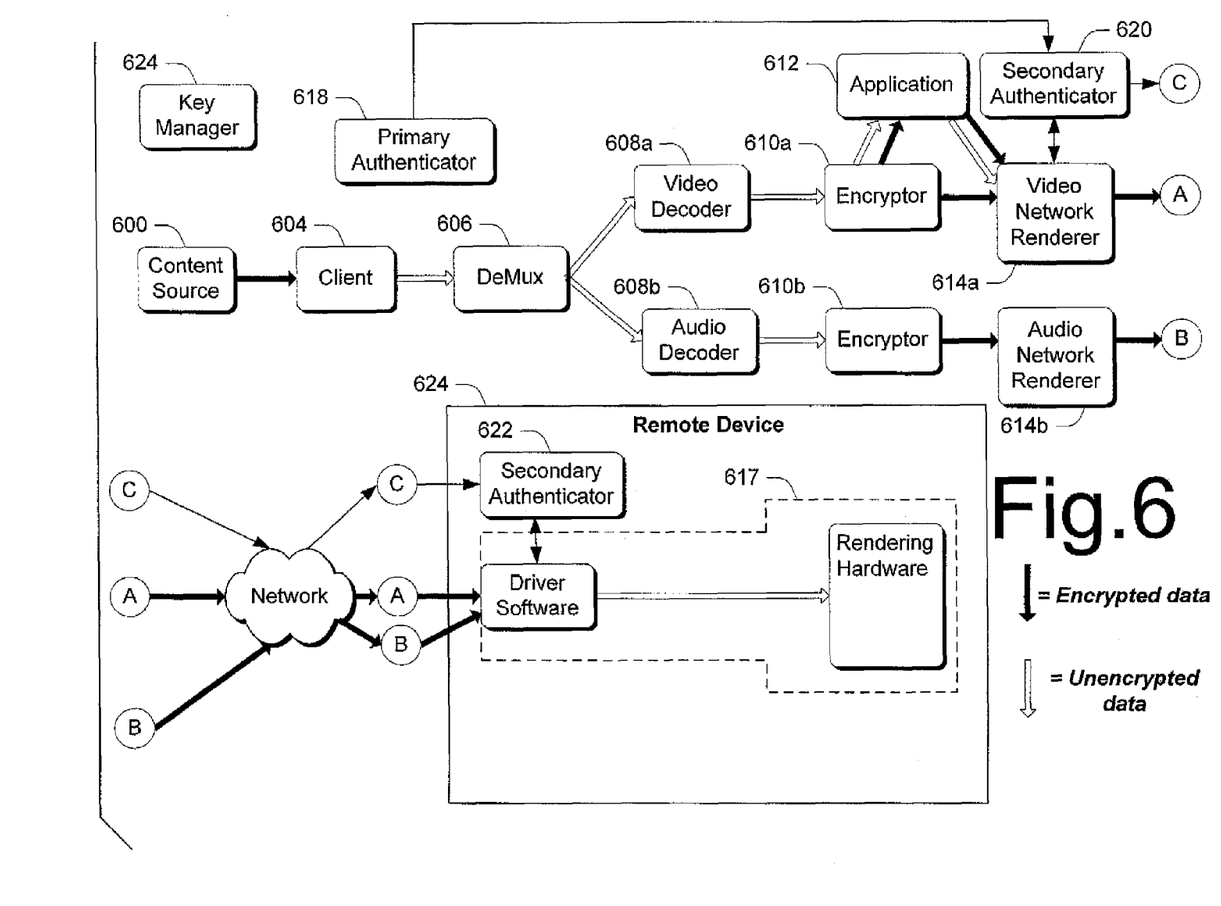
FIG. 6 is a block diagram that illustrates an exemplary system that can be utilized to implement one or more of the embodiments in connection with a network environment.

One of the advantages of the architecture described above is that it can be utilized in connection with, and applied in the context of a network, such as the Internet. As an example, consider FIG. 6 which shows a system that is similar, in many respects, to the system shown and discussed in connection with FIG. 4. Like numerals from the FIG. 4 embodiment have been utilized, where appropriate (except that the designators in FIG. 6 are in the form "6XX", whereas the designators in FIG. 4 are in the form "4XX").

In this example, a remote device 624 is provided and embodies software and hardware (collectively designated at 617) that can be used to render content on the remote device. Exemplary remote devices can include handheld PCs, PDAs, USB speakers, IEEE 1394 speakers and the like. Components such as the client 604, key manager 624, demultiplexer 606, decoders 608a, 608b, encryptors 610a, 610b, application 612, renderers 614a, 614b, and one or more authenticators such as primary authenticator 618 and secondary authenticator 620, can reside on one side of a network connection such as on a host. Device 624 can then communicate with the host via a network connection so that it can render protected content from a trusted source for a user.

In this example, remote device 624 includes an authenticator 622 that can be set up and configured in a manner that is very similar to the way that the kernel mode authenticator was set up and configured above.

That is, in this example, there is a logical connection between the authenticators on both sides of the network (e.g. authenticators 620 and 622). This logical connection is authenticated and encrypted for all of the reasons set forth above. The responsibility of the network renderer(s) is to communicate over the network and ascertain which components reside on remote device 624. The renderer(s) then establish the authenticator on remote device 624, and establish a communication channel between the two authenticators 620, 622. The channel can be used to set up keys between the encryptor 610a and the rendering hardware (617).

Once the various components in the processing chain on each side of the network have been authenticated, the protected content can be provided to remote device 624 for rendering.

Network Embodiment—Case II

Figure 7:
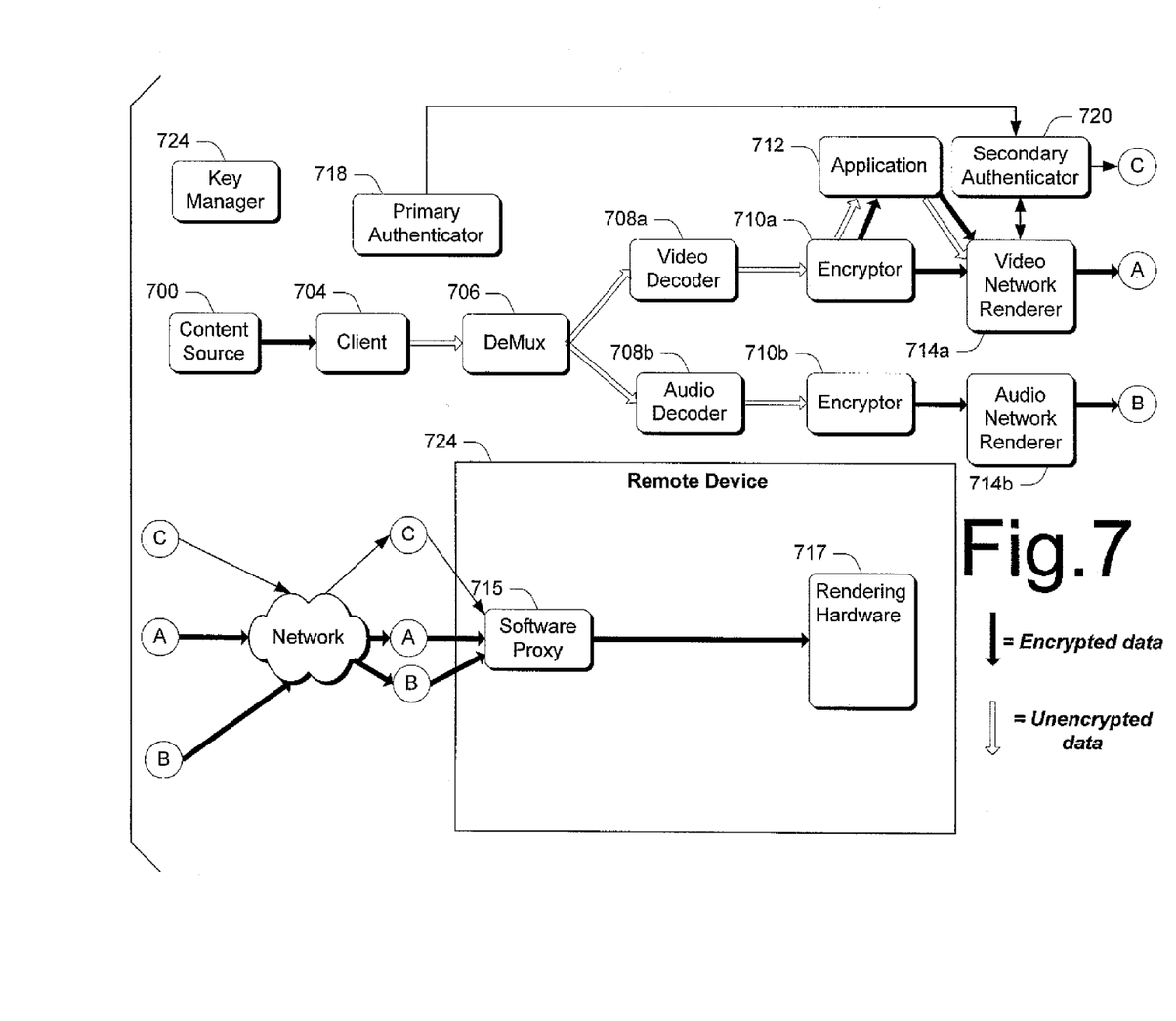
FIG. 7 is a block diagram that illustrates an exemplary system that can be utilized to implement one or more of the embodiments in connection with a network environment.

FIG. 7 shows a system that is slightly different from the system shown and described in FIG. 6. Here, remote device 724 embodies a purely hardware rendering component 717. A software proxy 715 is provided and can assist in the authentication process but may not necessarily be required to be trusted. Authentication can take place on the hardware itself as by, for example, providing PKI authentication support in the hardware.

In this example, the network renderer(s) can map the authentication protocol on the left side of the network to the hardware authentication protocol in device 724. This can make use of an authentication translation module that resides in the software proxy 715. In this case, then, the software proxy 715 will need to be trusted and verified. Alternatively, the hardware might be natively compatible with the authentication protocol on the left side of the network or, the hardware can contain a translation module to perform the mapping operation itself, thereby eliminating the need to trust or verify the software on the device.

This type of arrangement is advantageous from the standpoint of enabling third parties to write their own translator modules that can be employed on their own remote devices. These modules can then perform the translation of the authentication protocol and, as a result, are not locked into any one authentication design. Third parties can also set up user mode authenticators on the left side of the network if, for example, their video renderer needs to process unencrypted data.

In addition, the above architecture is also advantageous in that revocation lists can be transmitted over the various components, e.g. a server can send the revocation list to the client who can then send the list down the processing chain to the remote device. Consequently, any components that are revoked will no longer be able to process the protected data. For example, a license that accompanies protected content might specify that the content requires a media path authenticator and, in addition, the device must periodically access a server to obtain a revocation list. The user can then, with their remote device, play content for a period of time after which their device will need to access the server to obtain the revocation list so that the device can update their list of which components have been revoked.

Other Extensions and Advantages

The embodiments of FIGS. 6 and 7 can be extended such that the network renderer(s) is implemented as a broadcast renderer. For example, a broadcast service or server can set up and share encryption keys with a number of different hardware devices. The broadcast renderer can then broadcast protected content to these devices and be assured that the content will remain protected.

Another advantage of the architecture is that data can be passed back and forth between the user and kernel modes as many times as necessary. This can be advantageous for such things as echo cancellation of audio data. That is, an audio renderer can go into the kernel and create another processing chain that goes back out to a user mode component and then back into the kernel.

Conclusion

The methods and systems described above can provide improved methods and systems for processing renderable digital data. Some of the advantages of the above-described embodiments include, without limitation, that untrusted user mode components (decoders, video manipulations) and kernel mode components can be prevented from unauthorized access to protected content. Additionally, authorized components can be protected from being used to gain unauthorized access to protected content. Various third party components can be used in the processing chain and mechanisms can be provided to ensure that such components are trusted before they access protected content. Content from multiple different sources, as well as multiple different types of content and DRM techniques can be easily incorporated into the system by virtue of a translation process or translator modules. Various embodiments also permit protected content to be used across boundaries such as device and network boundaries, with an authentication process that is translatable across the boundaries. Further, revocation mechanisms (i.e. revocation lists) can be utilized to block compromised components from accessing protected content. The architecture can also enable secure communication channels to be established between the decoders and the rendering (i.e. display hardware). The architecture does not need prior knowledge of the component topology and be applied to complex structures since it follows the flow of data.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   receiving, with a client component, encrypted content that is to be protected during a rendering process;
   receiving a manifest associated with the content, the manifest specifying protected media path requirements for the rendering process;
   verifying that the client component is a trusted component;
   creating a primary authenticator that can be used to authenticate one or more components downstream from the client component, the downstream components each having an associated address and a signature, at least one downstream component to pass the content to another downstream component;
   articulating, to the primary authenticator, one or more downstream components that need to be authenticated;
   authenticating one or more downstream components using the primary authenticator;
   creating at least one secondary authenticator;
   articulating to the secondary authenticator one or more downstream components that need to be authenticated; and
   authenticating the signatures of the one or more downstream components at the addresses of said another downstream components that the downstream components pass the content to using the secondary authenticator wherein at least some of the components are hardware component.

2. The method of claim 1 further comprising determining whether any digital rights management data associated with the content needs to be translated to a form that can be understood by an authenticator's DRM system and, if so, effectuating translation of the digital rights management data.

3. The method of claim 1 further comprising determining whether any digital rights management data associated with the content needs to be translated to a form that can be understood by an authenticator's DRM system and, if so, effectuating translation of the digital rights management data by using a separate translator module that is configured to translate the digital rights management data.

4. The method of claim 1 further comprising determining whether any digital rights management data associated with the content needs to be translated to a form that can be understood by an authenticator's DRM system and, if so, effectuating translation of the digital rights management data by using a separate translator module that is configured to translate the digital rights management data, the translator module comprising a third party component.

5. The method of claim 1, wherein the act of articulating to the primary authenticator is performed by the client component, responsive to being queried by the primary authenticator.

6. The method of claim 1, wherein the act of verifying is performed by using a secure server.

7. The method of claim 1 further comprising after creating the secondary authenticator, verifying with the primary authenticator that the secondary authenticator is trusted.

8. The method of claim 1, wherein said acts of receiving, verifying, creating, articulating, and authenticating are performed within one device.

9. The method of claim 1 further comprising after authenticating multiple components, rendering the encrypted content.

10. The method of claim 1 further comprising after authenticating multiple components, effectuating rendering of the encrypted content across a communications network and on a device.

11. A computing device programmed to implement the method of claim 1.

12. One or more computer-readable media having computer-readable instructions thereon which, when executed by one or more processors, cause the one or more processors to:
   receive, with a client component, encrypted content that is to be protected during a rendering process;
   receive a manifest associated with the content, the manifest specifying protected media path requirements for the rendering process;
   verify that the client component is a trusted component;
   create a primary authenticator and at least one secondary authenticator, the authenticators being configured to authenticate one or more components downstream from the client component, the downstream components each having an associated address and a signature, at least one downstream component to pass the content to another downstream component;
   establish at least one secure communication channel between the authenticators;
   articulate, to the authenticators, one or more downstream components that need to be authenticated;
   authenticate the signatures of the one or more downstream components at the addresses of said another downstream components that the downstream components pass the content to using the authenticators; and
   allow the one or more components to communicate with one another using the secure communication channel.

13. The one or more computer-readable media of claim 12, wherein the instructions cause the one or more processors to determine whether any digital rights management data associated with the content needs to be translated to a form that can be understood by an authenticator's DRM system and, if so, effectuating translation of the digital rights management data.

14. The one or more computer-readable media of claim 12, wherein the instructions cause the one or more processors to enable the one or more components to set up session keys for use during the rendering process.

15. The one or more computer-readable media of claim 12, wherein the instructions cause the one or more processors to enable the one or more components to set up one or more banks of session keys for use during the rendering process, and cycle through the session keys during the rendering process.

16. A computing device embodying the computer-readable medium of claim 12.

17. A computing device comprising:
   memory;
   one or more processors;
   instructions in the memory which, when executed by the one or more processors, cause the one or more processors to:

receive, with a client component, encrypted content that is to be protected during a rendering process;

receive a manifest associated with the content, the manifest specifying protected media path requirements for the rendering process;

determine whether any digital rights management data associated with the content needs to be translated to a form that can be understood by an authenticator's DRM system and, if so, effectuating translation of the digital rights management data;

verify that the client component is a trusted component;

create a primary authenticator and at least one secondary authenticator, the authenticators being configured to authenticate one or more components downstream from the client component, the downstream components each having an associated address and a signature, at least one downstream component to pass the content to another downstream component; the authenticators including a user mode authenticator to authenticate user mode components and a kernel mode authenticator to authenticate kernel mode components;

establish at least one secure communication channel between the authenticators;

articulate, to the authenticators, one or more downstream components that need to be authenticated;

authenticate the signatures of the one or more downstream components at the addresses of said another downstream components that the downstream components pass the content to using the authenticators; and allow the one or more components to communicate with one another using the secure communication channel, and allow the one or more components to set up session keys for use during the rendering process.

* * * * *